UNITED STATES PATENT OFFICE.

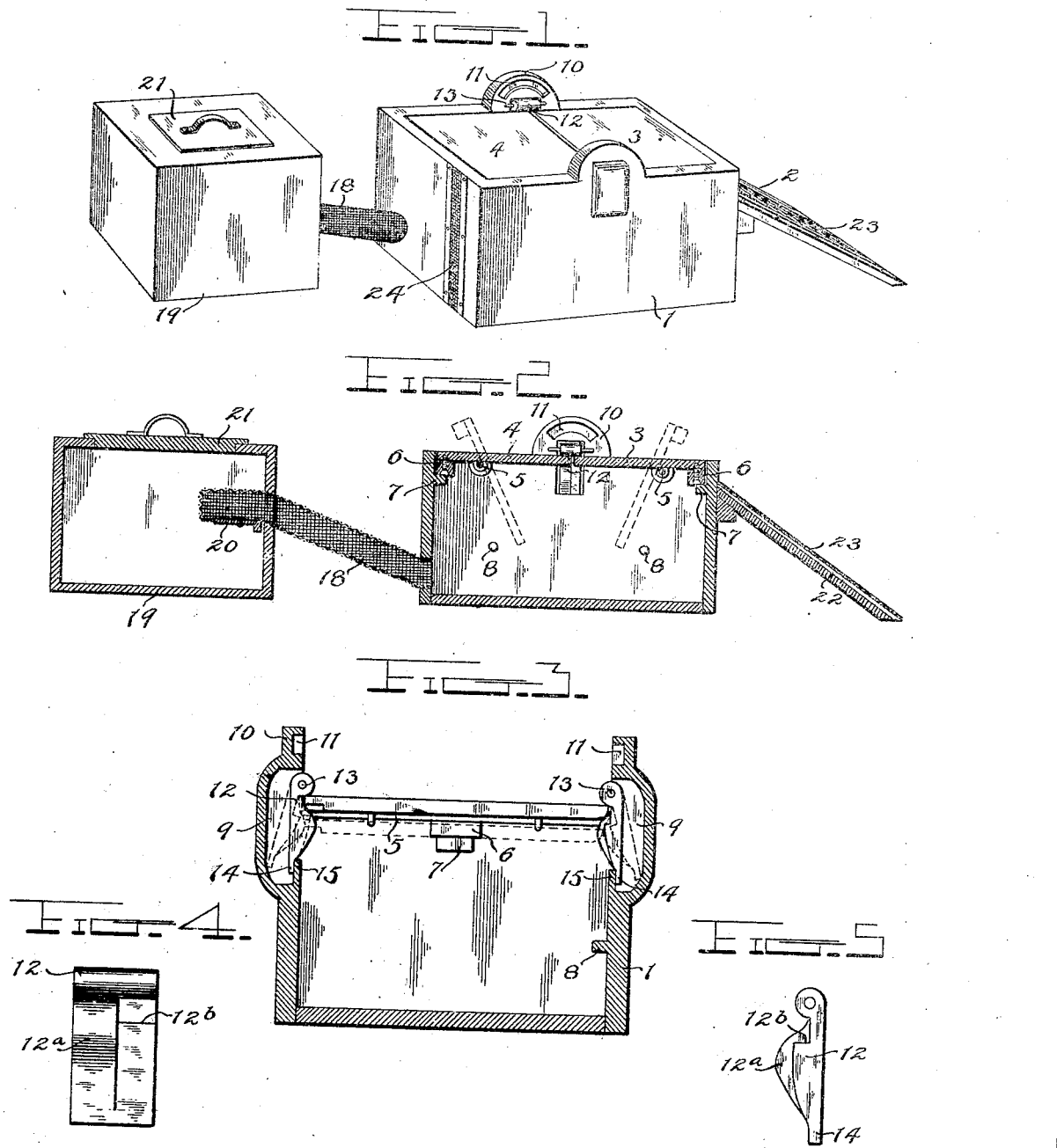

OGDA C. WOOD, OF EWING, NEBRASKA, ASSIGNOR TO MAX L. GLASSER.

ANIMAL-TRAP.

1,101,226.

Specification of Letters Patent.

Patented June 23, 1914.

Application filed January 10, 1914. Serial No. 811,237.

*To all whom it may concern:*

Be it known that I, OGDA C. WOOD, citizen of the United States, residing at Ewing, in the county of Holt and State of Nebraska, have invented certain new and useful Improvements in Animal-Traps, of which the following is a specification.

The present invention relates to certain new and useful improvements in animal traps, and has for its object to provide a self and ever set trap which embodies novel features of construction whereby the trap can not be sprung until after the animal is in such a position that escape is practically impossible.

A further object of the invention is to provide a trap of this character which is simple and inexpensive in its construction, which can be employed effectively for catching small animals such as rats, mice and the like, and which is light and compact in design so as to be readily transported from place to place.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a perspective view of an animal trap constructed in accordance with the invention. Fig. 2 is a longitudinal sectional view through the same, the position of the trap doors when closed being indicated by full lines and when swung downwardly by dotted lines. Fig. 3 is an enlarged transverse sectional view through the central portion of the trap, the normal position of the trap doors being indicated by full lines and the position thereof when releasing the detents being indicated by dotted lines. Fig. 4 is an enlarged front elevation of one of the cam detents, and Fig. 5 is a side elevation of the same.

Corresponding and like parts are referred to in the following description and indicated in all the views of the drawings by the same reference characters.

Referring to the drawing which illustrates one embodiment of the invention, the numeral 1 designates the box or casing of the trap. An inclined runway 2 leads to the top of the box from one end thereof, and a pair of trap doors 3 and 4 are arranged within the top of the box or casing 1 so as to normally close the same. These trap doors are identical in construction, being pivoted at a point spaced from the outer ends thereof, as indicated at 5, and being provided at their outer or remote ends with counter-weights 6 which normally tend to swing the same upwardly into a closed position. Stops 7 at opposite ends of the casing 1 serve to limit the swinging movement of the trap doors in one direction, while stops 8 project inwardly from the sides of the box or casing 1 and serve to limit the swinging movement of the trap doors in the opposite direction.

Opposite sides of the box or casing 1 are recessed at 9 adjacent the swinging edges of the trap doors and also provided at this point with the upward extensions or ears 10, said ears being provided with suitable recesses 11 within which the bait is placed. Mounted within each of the recesses 9 is a cam detent 12, the said detents being pivoted at their upper ends as indicated at 13 so as to normally be swung by the action of gravity into operative position. The inward swinging movement of the detents 12 is limited by engagement of ears 14 at the lower extremities thereof with an abutment 15.

The detents 12 are shown in detail by Figs. 4 and 5, and it will be observed that each of the detents is formed upon one side thereof with a cam 12$^a$ and upon the opposite side with an upwardly facing shoulder 12$^b$, the dividing line between the cam 12$^a$ and the shoulder 12$^b$ being directly opposite the dividing line between the swinging edges of the trap doors 3 and 4. The two cam detents 12 are oppositely positioned so that the shoulders 12$^b$ of one of the detents is normally swung under the trap door 3 to hold the same in a raised position while the shoulder 12$^b$ of the opposite detent is normally swung under the opposite trap door 4 to also hold the same in a raised position. The swinging edges of the trap doors are normally held slightly above the shoulders 12$^b$ by means of the counter-weights 6, although the weight of the animal upon either of the trap doors will swing the same against the shoulder 12$^b$ of one of the cam detents 12, at the same time causing the edge of the trap door to engage the cam portion 12$^a$ of the opposite detent so as to swing the same into inoperative position and move the shoulder 12$^b$ thereof away from under the swinging edge of the other trap door. As soon, however, as the animal reaches the center of the trap and causes any weight to bear upon the other trap door, the initial downward movement of this other trap door would engage the cam portion 12$^a$ of the first cam detent so as to also move the same into an inoperative position. Both cam detents being then inoperative, the two trap doors would swing downwardly simultaneously and drop the animal into the interior of the casing 1. The counter-weights 6 would immediately swing the trap doors again into a closed position so as to reset the trap and prevent escape of the animal just dropped into the same. The animal may be held within the casing 1, although it is preferred to provide a passage such as that indicated at 18 for leading the animal to a second trap box or container 19, thereby getting the animal away from the trap so that it will not frighten away other animals or possibly escape when the trap doors are next actuated. A swinging trap door 20 of any conventional construction may be provided at the discharge end of the passage 18, and any suitable removable cover 21 may be provided for the second trap box 19.

Referring to Fig. 2, an animal attempting to get the bait within the recesses 11 would naturally reach the top of the box or casing 1 by means of the runway 2. It would first walk upon the trap door 3, thereby moving the swinging edge of the said trap door 3 into engagement with the shoulder 12$^b$ of one of the cam detents 12, and at the same time causing the swinging edge of the trap door 3 to engage the cam portion 12$^a$ of the opposite cam detent so as to swing the same into inoperative position and release the trap door 4. In getting the bait a portion of the animal's body would inevitably be brought to bear upon the trap door 4 and the initial downward movement thereof would act upon the cam portion 12$^a$ of the first detent to swing the same into inoperative position and thereby release the trap door 3. With both trap doors released the animal would be dropped into the casing.

It is preferred to provide the runway 2 with a longitudinal groove 22 to receive a small amount of bait, although this groove is covered with wire netting 23 or the like to prevent the animal from getting the same. In a similar manner the end of the box may be provided with a bait groove and covered by a screen 24. The bait in these grooves serves to attract the animal, although the only bait which is open and accessible is that within the recesses 11 of the upward extensions 10.

Having thus described the invention, what I claim as new and desire to secure by Letters Patent, is:—

1. An animal trap including a casing having an open top and provided upon opposite sides thereof with recessed portions, means for supporting bait adjacent the said recessed portion, a pair of trap doors normally closing the top of the casing, gravity detents mounted within the recessed portions of the casing for engagement with the respective trap doors, and a cam member upon each of the gravity detents, the said cam members being arranged in the paths of the opposite trap doors so that the initial movement of either trap door will release the detent of the opposite trap door.

2. An animal trap including a casing having an open top and provided upon opposite sides thereof with recessed portions and with upwardly projecting ears constructed to receive bait, a pair of trap doors normally closing the top of the casing and meeting adjacent the recessed portions of the casing, gravity detents mounted within the recessed portions of the casing and engaging the respective trap doors to support the same in a closed position, and a cam member upon each of the detents and arranged within the path of the opposite trap door so that the initial downward movement of either trap door will release the detent of the opposite trap door.

In testimony whereof I affix my signature in presence of two witnesses.

OGDA C. WOOD.

Witnesses:
  WM. H. GRAVER,
  F. R. BIGNOLD.